Feb. 2, 1937. C. NEUBRONNER 2,069,459
CARRYING DEVICE FORMED BY AN ADHESIVE STRIP
Filed Feb. 11, 1936 2 Sheets-Sheet 1
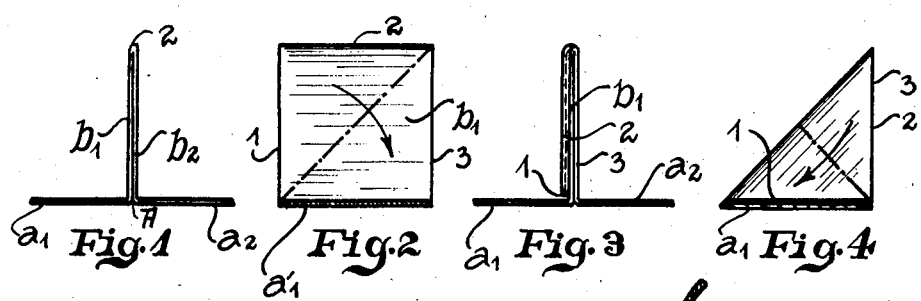
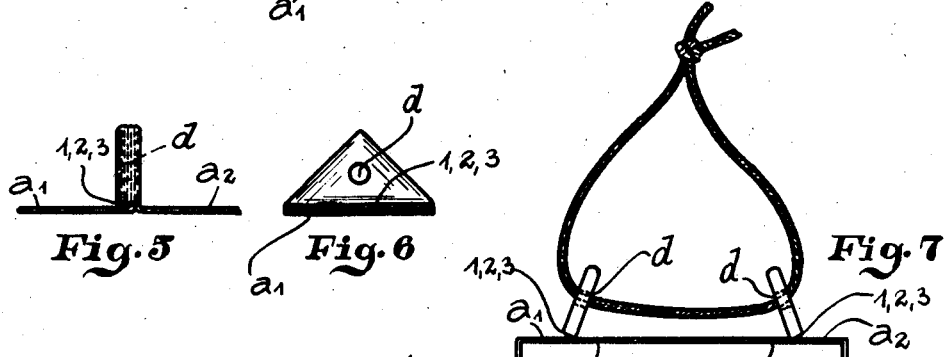
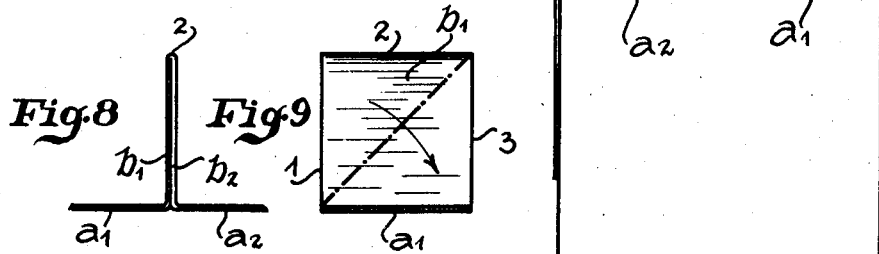
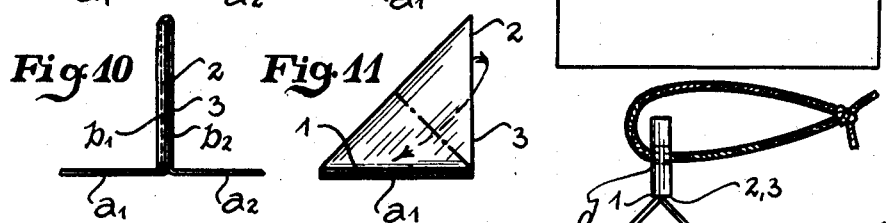
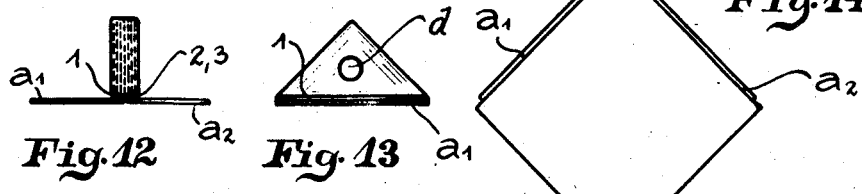

Feb. 2, 1937.   C. NEUBRONNER   2,069,459
CARRYING DEVICE FORMED BY AN ADHESIVE STRIP
Filed Feb. 11, 1936   2 Sheets-Sheet 2

Patented Feb. 2, 1937

2,069,459

UNITED STATES PATENT OFFICE 2,069,459

CARRYING DEVICE FORMED BY AN ADHESIVE STRIP

Carl Neubronner, Oberursel, near the Taunus, Germany

Application February 11, 1936, Serial No. 63,373 In Germany March 4, 1935

6 Claims. (Cl. 229—52)

This invention relates to a carrying device for parcels or the like formed by an adhesive strip. The commonly used carrying devices of this type possess numerous inconveniences. Carrying devices are for instance known which consist of an adhesive strip and of a band extending parallel to the strip and stuck on the adhesive surface, a portion of the band extending through a longitudinal slit in the adhesive strip to form a loop-shaped handle. In view of the fact that in such devices the adhesive strip easily may be torn by the band at the ends of the slit, transverse reinforcing strips are usually stuck on the strip at the ends of the slit whereby the cost of manufacture is considerably increased. To ensure in such carrying devices the adhesion of the adhesive strip, the direction of pull of the loop-shaped handle of the band must be approximately the same as the direction of the ends of the adhesive strip stuck on the parcel. If, however, the pulling force exerted by the band on the adhesive strip acts approximately perpendicular to the plane of the adhesive strip the danger exists that this strip detaches from the parcel or the like. There are also other disadvantages.

The carrying device according to the invention consists of an adhesive strip which is folded so that a lug is produced, projecting from the adhesive strip and through which a carrying means for instance a thin hemp cord is threaded. The primary object of the invention consists in increasing the holding power of the carrying device and in preventing the device from becoming torn by the weight of the parcel or the like. Another object of the invention consists in providing a carrying device which may be produced automatically by means of a folding machine. A further object of the invention consists in providing a carrying device which may be attached to parcels of different kind without reducing the holding power of the device. Other objects and advantages will appear as the description proceeds.

Several embodiments of the invention are illustrated by way of example in the acompanying drawings.

Figs. 1-6 illustrate the steps for producing a lug according to the invention.

Fig. 7 shows how lugs according to Figs. 1 to 6 are employed as carrying device for a parcel.

Figs. 8 to 13 illustrate the steps for producing a second form of lug.

Fig. 14 shows how this lug may be employed for carrying a parcel.

Figure 15:
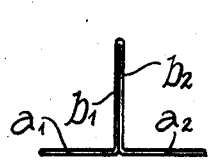
Figs. 15 to 18 illustrate the steps for producing a third type of lugs.

As shown in Fig. 1 the adhesive strip is folded so that a square lug $b_1$, $b_2$ is produced which projects from the plane of the adhesive strip $a_1$, $a_2$. The two halves $b_1$, $b_2$ of the lug are stuck the one on the other. Carrying strips with a lug as shown in Fig. 1 are known. In the lug $b_1$, $b_2$ an eye is arranged through which a cord is threaded, the ends $a_1$, $a_2$ of the adhesive strip being stuck on the parcel to be carried. Such a device presents the following inconveniences. The adhesive strips $a_1$, $a_2$ detach from the parcel on which they are stuck at the point A and the two halves $b_1$, $b_2$ of the lug detach the one from the other. In this manner an almost triangular air gap is formed which continually enlarges until the carrying device becomes useless. If the stress substantially acts on one side only, the strongly stressed half tears after it has detached partly from the other half. If the tensile stress were of approximately similar strength on both halves of the lug $b_1$, $b_2$ the portion of the adhesive strip stuck on the parcel detached more and more from the parcel in simultaneous widening the air gap between the lug halves $b_1$, $b_2$ until the parcel dropped off the adhesive strip.

These inconveniences are avoided according to the invention.

Fig. 2 is a side elevation of Fig. 1. The lug according to the invention is obtained from the carrying device shown in Figs. 1 and 3 by folding the lug $b_1$, $b_2$ at least once along one of its diagonals (indicated in Fig. 2 in dash-dot lines) and folding over the bent-off lug portion from the plane of the lug by 180° so that at least one of the side edges of the lug lies approximately in the plane of the adhesive strip $a_1$, $a_2$.

Fig. 3 shows a carrying lug only once folded as described. One of the three side edges 1, 2, 3 of lug $b_1$, $b_2$, i. e. the edge 1, extends approximately in the plane of the adhesive strip $a_1$, $a_2$. This is also shown in Fig. 4, which is a side elevation of Fig. 3.

It is advisable to fold the lug a second time and along the second diagonal of the square shape of lug $b_1$, $b_2$. This second diagonal is indicated in dash-dot line in Fig. 4 and coincides with the line extending from the vertex perpendicular to the hypotenuse of the rectangular triangle formed as the result of the first folding. The result of the second folding is illustrated in Figs. 5 and 6 in end view and in side elevation. All side edges 1, 2, 3 of lug $b_1$, $b_2$ lie now substantially in the plane of the adhesive strip $a_1$, $a_2$.

The lug may receive a hole $d$ at the centre as shown in Fig. 6. Fig. 7 illustrates how a parcel is carried by means of two lugs folded according to Figs. 1 to 6, a cord being threaded through the holes $d$ of the two lugs.

According to Figs. 2 to 6 the two foldings are carried out in inverse sense. First the folding along the diagonal of Fig. 2 has been done from left to right, and then the folding along the diagonal of Fig. 4 from right to left.

According to Figs. 8 to 13 both foldings are carried out in the same sense. The lug $b_1$, $b_2$ is first folded from left to right as indicated in Fig. 9 by an arrow so that the lug shown in Figs. 10 and 11 is obtained, identical with that of Fig. 3. The second folding is done, however, as shown in Fig. 11, from right to left, that is not in front of the paper plane as according to Fig. 4, but behind it. The lug shown in Figs. 12 and 13 is thus obtained which consists of a central part directly extending from the adhesive strip and twice the thickness of the adhesive strip and of two side parts one on the one side and the other on the other side of the central part, one side part of twice the thickness of the adhesive strip and the other four times the thickness of the adhesive strip. The central part is formed by the two layers $b_1$, $b_2$ of the adhesive strip as shown in Fig. 8 from which the lug has been folded. After the folding according to Figs. 12 and 13 is carried out, two side edges of the lug, i. e. the side edges 2 and 3, are on one side of this inner part and the third side edge 1 is on the other side of the inner part.

Experiments have shown, that the carrying device according to the invention as shown in Figs. 5 and 6 and 12 and 13 respectively can withstand much higher stresses than the already known device according to Figs. 1 to 8. This may be explained as follows: As mentioned above the already known carrying device according to Figs. 1 and 8 was destroyed by tensile forces acting on one side in that the two layers $b_1$, $b_2$ detached the one from the other so that the one of these layers had to take up the whole tensile stress and consequently did tear. If the sticking connection between the two halves of the lug was very strong the paper of the one lug half did split whereupon destruction of the carrying device occurred even sooner. If in the lugs shown in Figs. 3 and 5 the left adhesive strip $a_1$ exerts a strong pull in lefthand direction, for instance in a carrying device shown in Fig. 7, the separation is prevented by the layers formed by the folding and situated at the left of the stuck joint in which the inclination to separate exists. If in the forms of construction according to Figs. 3 and 5 the carrying devices were stressed by forces acting in right-hand direction on the adhesive strip $a_2$, the danger of destruction would be present quite as well as in the known devices according to Fig. 1. If the carrying device shown in Figs. 3 and 5 is clamped in a pulling device exerting oppositely directed forces upon the strip parts $a_1$ and $a_2$, the part of the carrying device at the right of the stressed sticking face will be torn off. For this reason the carrying device shown in Figs. 3 and 5 is suitable only if one-sided tensile stresses exist as is the case in the application shown in Fig. 7. It is evident, that the carrying device shown in Figs. 12 and 13 is suitable also for two-sided tensile stresses, for instance in the case illustrated in Fig. 14.

It has been mentioned above that in the device shown in Fig. 1 the adhesive strip begins to detach from the parcel at the point A. This detaching is favoured thereby that the lug splits at the same time at the middle whereby the parts $a_1$, $a_2$ of the adhesive strip are gradually pulled off the parcel. This phenomenon does not occur in the carrying devices according to the invention for the reason that in this device the danger of splitting is obviated.

In order to prevent detaching, the folded parts of the carrying device according to the invention are stuck together, that is the faces of the same lying the one on the other are painted with adhesive substance and thereby connected the one with the other.

Figure 16:
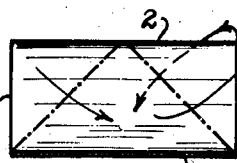
Figure 17:
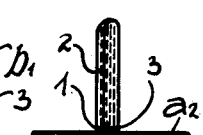
Figure 18:
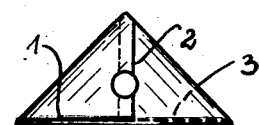
Figure 19:
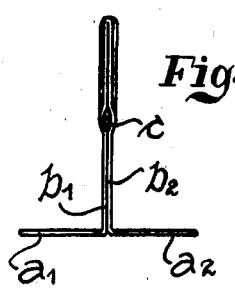
Figs. 19 to 24 illustrate the steps for producing a fourth type of lugs similar to the second type of lugs differing from the same by the insertion of a thread in the folds.

Carrying devices according to the invention can also be produced by folding each half of the adhesive strip in accordance with the above explanations. A half of the adhesive strip means the right half and the left half of the same viewed in the longitudinal direction of the adhesive strip. An embodiment of this type is illustrated in Figs. 15 to 18. As shown in Fig. 16 the left half of the lug $b_1$, $b_2$ which is shown in Fig. 15 in front view is folded over forwardly along the diagonals indicated in dash-dot lines, so that the edge 1 comes into the position shown in Fig. 17. The right half of the lug is folded over backwards as shown in Fig. 16 so that the side edge 3 of the lug comes into the position also indicated in Fig. 17. Fig. 18 shows in side elevation the carrying lug having a perforation for a cord. The carrying device shown in Fig. 18 may be employed only for parcels of relatively light weight. A carrying device may, however, be produced in a similar manner, which is adapted for carrying heavy parcels. Starting from Fig. 1 the lug $b_1$, $b_2$ is first folded over not in diagonal direction but along its horizontal symmetry line, for instance from right to left. The upper side edge 2 is thereby placed at the side of the edge which exists between the end of the adhesive strip $a_1$ and the half $b_1$ of the lug. A lug as shown in Fig. 16, is thus obtained which, however, is only half as high as the normal lug but comprises four layers of adhesive strip. This lug is then folded according to Fig. 16 the corners of the lug being however folded in the same sense, i. e. so that the side edges 1 and 3 come to lie on the bending edge which exists between the part $a_2$ of the adhesive strip and the half $b_2$ of the lug.

Figure 20:
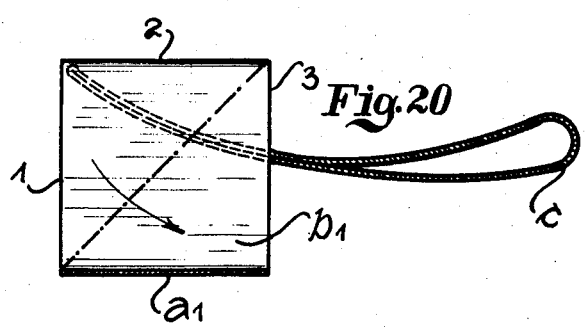
Figure 21:
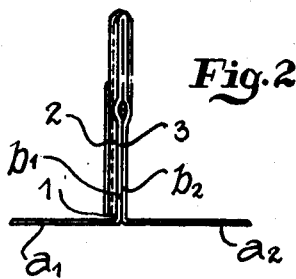
Figure 22:
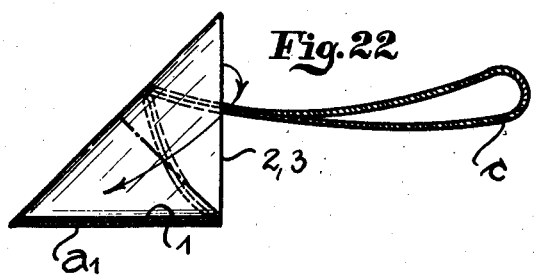
Figure 23:
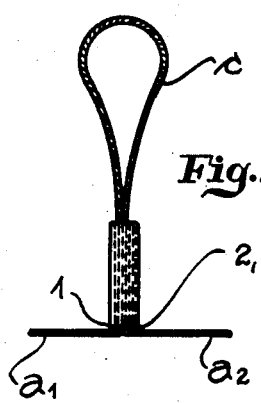
Figure 24:
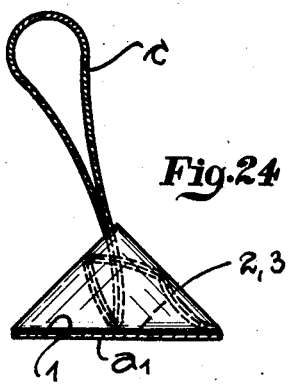

As shown in Figs. 19 to 24 a string serving as carrying means is inserted during the folding between the layers of the carrying lug in such a manner that it extends from the upper vertex of the rectangular isosceles triangle that constitutes the shape of the finished lug. During the formation of the carrying lug $b_1$, $b_2$ a string $c$ is placed between the lug halves $b_1$ and $b_2$ as shown in Fig. 20. The two string ends are on the corner which exists between the two edges 1 and 2. These ends extend then so that they lie within the upper lug half and project from the lug $b_1$, $b_2$ at the middle of the side edge 3. The lug $b_1$, $b_2$ is then folded over in forward direction (as shown by an arrow) along the diagonal which is indicated in dash-dot line in Fig. 20 so that the side edge 1 comes to lie at the side of the bending edge existing between the part $a_1$ of the adhesive strips and the half $b_1$ of the lug, as shown in Figs. 21 and 22. Fig. 22 shows clearly the position which the portion of the string assumes which is arranged between the lug halves $b_1$, $b_2$ after the lug has been folded over along the diagonal indicated in dash-dot line in Fig. 20. The lug is then folded over a second time as has been explained in detail in connection with Figs. 8 to 13. The portion of the string lying outside the fold is held so that after the folding has been completed the string extends as shown in Fig. 24. According to this figure the two ends of the string in the folded lug extend along the vertical of the triangular carrying lug, i. e. they are perpendicular to the folded-over edges 2, 3.

I claim:

1. A carrying device formed by an adhesive strip, in which the adhesive strip is folded in such a manner that a lug extending from the adhesive strip adapted for holding a carrying means is produced, the lug being folded at least once along one of its diagonals and the bent-off portion of the lug being folded by 180° from the plane of the lug so that at least one of the side edges of the lugs lies substantially in the plane of the adhesive strip.

2. A carrying device formed by an adhesive strip as specified in claim 1, in which the lug is square and has two folds one along the diagonal of the square and the other along the vertical line of the rectangular triangle formed by the first folding, so that three side edges of the lug lie substantially in the plane of the adhesive strip.

3. A carrying device formed by an adhesive strip as specified in claim 1, in which the lug is square and has two folds one along the diagonal of the square and the other along the vertical line of the rectangular triangle formed by the first folding, so that three side edges of the lug lie approximately in the plane of the adhesive strip, the folded-over lug parts being folded over in the same direction so that the lug consists of a central part directly continuing the adhesive strip and of twice the thickness of said adhesive strip and of side parts one on each side of the central part, one of said side parts being of twice the thickness and the other of four times the thickness of said adhesive strip.

4. A carrying device formed by an adhesive strip as specified in claim 1, comprising a string serving as carrying means and inserted during the folding of the lug between the layers of this lug so that from the point of the lug a portion of said string projects and forms a carrying loop.

5. A carrying device for parcels, comprising in combination an adhesive strip being folded to form a lug extending off from the plane of the adhesive strip, said lug being adapted for holding a carrying means, and reinforcing sheets on the outer sides of the inner part of said lug, edges of said reinforcing sheets being arranged substantially in the plane of the adhesive strip.

6. A carrying device for parcels, comprising in combination an adhesive strip being folded to form a lug extending off from the plane of the adhesive strip, said lug being adapted for holding a carrying means, and reinforcing sheets on the outer sides of the inner part of said lug, said sheets being formed by folding at least twice the inner part of the lug in such a manner that edges of the bent-off portions lie substantially in the plane of the adhesive strip.

CARL NEUBRONNER.